(12) United States Patent
Bircann et al.

(10) Patent No.: US 6,455,185 B2
(45) Date of Patent: Sep. 24, 2002

(54) REFORMATE CONTROL VALVE ASSEMBLY FOR A FUEL CELL

(75) Inventors: Raual A. Bircann, Penfield; Dwight A. Palmer, Rochester; Harry R. Mieney, Byron, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/738,535

(22) Filed: Dec. 15, 2000

Related U.S. Application Data

(60) Provisional application No. 60/198,607, filed on Apr. 19, 2000.

(51) Int. Cl.[7] .................................................. H01M 8/04
(52) U.S. Cl. ........................................... 429/39; 429/34
(58) Field of Search ............................... 429/17–19, 34, 429/39

(56) References Cited

U.S. PATENT DOCUMENTS

| | | | | |
|---|---|---|---|---|
| 3,935,794 A | * | 2/1976 | Rumsey | 91/488 |
| 4,002,805 A | * | 1/1977 | Waldman | 429/17 |
| 4,974,571 A | * | 12/1990 | Oppenheim | 123/531 |
| 5,119,691 A | * | 6/1992 | Lichti | 74/568 |
| 6,250,602 B1 | * | 6/2001 | Jansen | 251/129.11 |

* cited by examiner

Primary Examiner—Patrick Ryan
Assistant Examiner—Mark Ruthkosky
(74) Attorney, Agent, or Firm—John VanOphem

(57) ABSTRACT

A three-way gas control valve assembly for selectively controlling gas flow from one inlet port into two outlet ports or vice-versa, such as may be required for flow control of hydrogen-containing reformate in fuel cell applications. The valve assembly comprises three subassemblies: a metering subassembly disposable within the high-temperature environment in the fuel cell for mechanically regulating reformate flow; an actuating subassembly disposable outside the fuel cell and connected to the metering subassembly for actuating a pintle shaft and valve head in the metering subassembly; and a coupling tube subassembly extendable through an insulative shroud to mechanically couple and thermally isolate the metering and actuating subassemblies.

14 Claims, 4 Drawing Sheets

REFORMATE CONTROL VALVE ASSEMBLY FOR A FUEL CELL

CROSS REFERENCE TO RELATED APPLICATIONS

This application claims the benefit of U.S. Provisional Patent Application Serial No. 60/198,607, filed Apr. 19, 2000.

TECHNICAL FIELD

The present invention relates to pintle-type valves; more particularly, to such valves for variably regulating the flow of fluids, and especially gases, among three ports; and most particularly, to a control valve assembly for controllably varying the flow of gas from one inlet port into two outlet ports (three-way valve), such as may be required for reformate flow control in fuel cell applications.

BACKGROUND OF THE INVENTION

Pintle-type valves are well known in the art for variably controlling flow of fluids, including gases. The advent of fuel cells as alternative propulsion systems or auxiliary power units for automotive and other similar applications, has created a need for improved, highly specialized gas flow control valves. Such fuel cells are known to use hydrogen gas as an energetic fuel for exothermic combination with oxygen at high temperature. Hydrogen may be supplied continuously to a fuel cell as a "reformate" product of catalytic degradation of hydrocarbons such as gasoline or methanol. At startup of the reformer, however, the reformer operating temperature typically is too low for production of a satisfactory percentage of hydrogen in the reformate. Therefore, until the reformer achieves a sufficiently high temperature, the fuel cell cannot be started and the reformate output is diverted to a waste burner rather than being simply discharged to the atmosphere. As the percentage of hydrogen in the reformate increases, the reformate output stream is gradually diverted by a three-way valve away from the burner and to the fuel cell. Sensitive control of such diversion is highly important to satisfactory operation of the fuel cell.

The requirements of such valves, including material properties, operating at very high temperatures (800° C. or greater), operating in corrosive environments, and minimum tolerance for leakage, are difficult or impossible for prior art valves to meet. Degradation of materials resulting from sustained exposure to such conditions can diminish valve performance significantly, leading ultimately to valve and fuel cell failure. Some components of prior art valves, such as force-balancing springs, may experience appreciable set or relaxation at high temperatures, rendering them useless, or their working lifetimes may be significantly shortened. Operating at such high temperatures can cause excessive linear expansion in critical elements, rendering gas metering inaccurate or impossible. Plastic parts can melt or become deformed, thereby rendering the valve permanently inoperative.

Some prior art specialized industrial gas control valves may meet some of the individual requirements, such as leakage, flow capacity, or operating temperature. However, they are impractical for automotive applications because of excessive size, prohibitive cost, slow response, and required actuation force. The cost of some prior art valves can approach or exceed the targeted cost of the entire vehicle for which a flow-control valve is intended. For these reasons, prior art valves are not suitable.

What is needed is a three-way gas flow control valve assembly having valving components which can stand extremely high operating temperatures (greater than 800° C.), actuating components which can operate in moderately high temperatures (100–150° C.), and means for thermally isolating the valving components from the actuating components. Such a valve assembly must be relatively small and lightweight, inexpensive to manufacture, highly reliable, and virtually leak-proof.

It is the primary object of the invention to provide an improved three-way valve assembly meeting these criteria for use in selectively controlling the flow of reformate from a hydrocarbon reformer to a waste burner and to a fuel cell.

SUMMARY OF THE INVENTION

The invention is directed to a three-way gas control valve assembly for selectively controlling gas flow from one inlet conduit into two outlet conduits or vice-versa, such as may be required for flow control of reformate in fuel cell applications. The valve assembly comprises three subassemblies: a metering subassembly disposable within the high-temperature environment in the fuel cell for mechanically regulating reformate flow; an actuating subassembly disposable outside the fuel cell and connectable to the metering subassembly for actuating a pintle shaft and valve head in the metering subassembly; and a coupling tube subassembly extending through an insulative zone to mechanically couple and thermally isolate the metering and actuating subassemblies.

The metering subassembly comprises a valve body having first and second chambers. The first chamber is provided with first and second opposed valve seats surrounding opposed first and second regulated ports. The first regulated port leads outside the valve, and the second regulated port leads to the second chamber. A dual-faced valve head disposed in the first chamber between the opposed valve seats is connected to a pintle shaft extending through the second regulated port by which the valve head can be axially translated to selectively occlude either the first or second seat but not both simultaneously. The first chamber is provided with a first non-regulating port and the second chamber is provided with a second non-regulating port, each non regulating port leading outside the valve to serve as either a gas inlet or gas outlet to the first and second chambers, respectively.

The actuating subassembly comprises a solenoid actuator having an internal armature and armature shaft for engaging the outer end of the pintle extending through an inner bearing disposed in a wall of the metering subassembly. Armature travel is controlled by computer and an axial position sensor attached to the armature.

The coupling tube subassembly comprises a cylindrical element which surrounds the pintle shaft where it extends through the insulative covering of the fuel cell, supports an outer bearing for the pintle shaft, and connects the valve body to the actuator.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
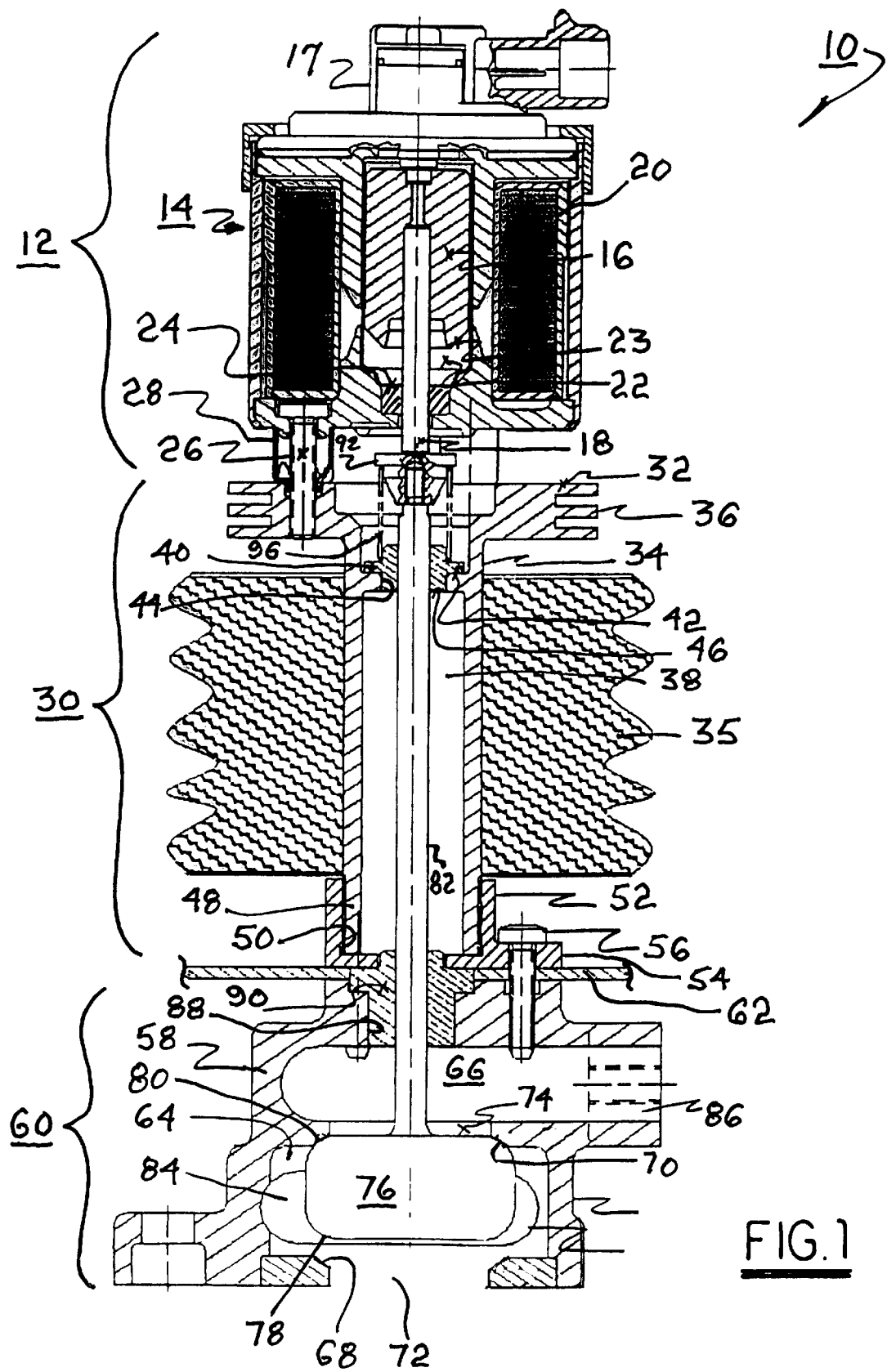
FIG. 1 is a cross-sectional elevational view of a first embodiment of a three-way reformate control valve assembly in accordance with the invention.

Referring to FIG. 1, a first embodiment 10 of a three-way reformate control valve assembly for a fuel cell comprises an actuating subassembly 12 including an actuator 14 which may be of any suitable type such as a stepper motor or DC motor but preferably is a solenoid having an armature subassembly 16 including an armature shaft 18. Armature subassembly 16 is disposed conventionally within the windings 20 such that its travel authority is defined by the axial clearance 22 between the armature 23 and a guiding sleeve 24. Armature travel is precisely controlled by PWM logic in a controller (not shown) operatively connected to an armature position sensor 17.

Screws 26 and hollow spacers 28 secure actuating subassembly 12 to a coupling tube assembly 30 by engaging bores in flange 32 of upper flanged tube 34. Circumferential ribs 36 are provided on flange 32 for dissipating heat from the fuel cell to the environment and reducing unwanted heating of actuator 14.

Upper flanged tube 34 includes an axial bore 38 interrupted by an annular boss 40 forming a shelf 42 and narrowed axial bore 44 for receiving a radially compliant shaft bearing 46. Preferably, the diameter of bore 44 is slightly greater than the diameter of the portion of upper bearing 46 disposed in bore 44, so that upper bearing 46 may be radially compliant in response to any axial misalignments within valve assembly 10. Upper flanged tube 34 extends through an insulative shroud 35 around the fuel cell and is sealingly disposed as by welding, threading, or slip fit and set screws, at the lower end 48 in a socket 50 in lower receptacle 52 which is provided with a partial flange 54 having throughbores for receiving bolts 56 to secure coupling tube subassembly 30 to valve body 58 of metering subassembly 60. Preferably, fuel cell housing or mounting plate 62 is sandwiched therebetween to secure valve assembly 10 to the fuel cell.

Valve body 58 has first and second chambers 64 and 66, respectively. First chamber 64 contains first and second opposed valve seats 68,70 surrounding opposed first and second regulated ports 72,74. First regulated port 72 leads outside the valve, and second regulated port 74 leads to second chamber 66. A valve head 76 disposed in first chamber 64 between the opposed valve seats is provided with first and second sealing faces 78, 80 for mating with, first and second seats 68,70, respectively, to open and close access to first and second regulated ports 72,74, respectively. Valve head 76 is connected to a pintle shaft 82 extending through second regulated port 74 and second chamber 66 by which means the valve head may be axially moved to selectively and progressively occlude either the first or second seat but not both simultaneously. First chamber 64 is provided with a first non-regulating port 84 and second chamber 66 is provided with a second non-regulating port 86, each non-regulating port leading outside the valve to serve as either a gas inlet from the reformer (not shown) or gas outlet to the first and second chambers 64,66, respectively, between the waste burner (not shown) and the fuel cell reaction chamber (not shown).

Metering subassembly 60 must be formed of material which is highly resistant to corrosion or deformation at high temperatures inside the fuel cell. Preferably, valve body 58, seats 68,70, and head 76 are formed of an Inconel alloy, which has the added advantage that all components have identical coefficients of thermal expansion.

Stepped bore 88 in a wall of valve body 58 is receivable of a stepped lower bearing 90 coaxially disposed with seats 68,70 and head 76, which bearing is preferably pressed into bore 88 without provision for radial compliance as in upper bearing 46. Bearing 90 is clamped into bore 88 by the just-described bolting of lower receptacle 52 to valve body 58 and provides primary guidance for pintle shaft 82 in axial motion. Preferably, the diametral clearance between bearing 90 and pintle shaft 82 is held to the smallest possible value that still allows free axial motion of shaft 82. To ensure that this relationship remains invariant over the range of anticipated operating conditions, the press fit, bearing diameter, shaft diameter, and surface finish of all these components are carefully selected and matched. The materials preferably are superalloys which are alumina or chromia formers, for example, Haynes 230, 214, and 242; Inconel 625 or 718; Hastelloy X; Incoloy MA 956; Numonic 105; and other similar similar materials which are dimensionally stable and corrosion-resistant at high temperatures.

Pintle shaft 82 extends through coupling tube assembly 30 and terminates in an actuator-receiving element which preferably is a flat-headed capnut 92 which threads onto the end of shaft 82 and presents a broad upper surface for contact with armature shaft 18. Shaft 18 engages capnut 92 as a pressure plate but is not mechanically connected thereto, thus relaxing the alignment requirements of actuator 14 with shaft 82.

Preferably, all components of the coupling tube subassembly and the pintle shaft are formed of the same material, for example, a stainless steel so that longitudinal thermal expansion of the upper flanged coupling tube, which supports the actuator, is the same as that of the pintle shaft, which interacts with the actuator armature. Thus, calibration of the armature position sensor is unaffected by thermal expansion of the coupling tube subassembly and the pintle shaft.

Figure 4:
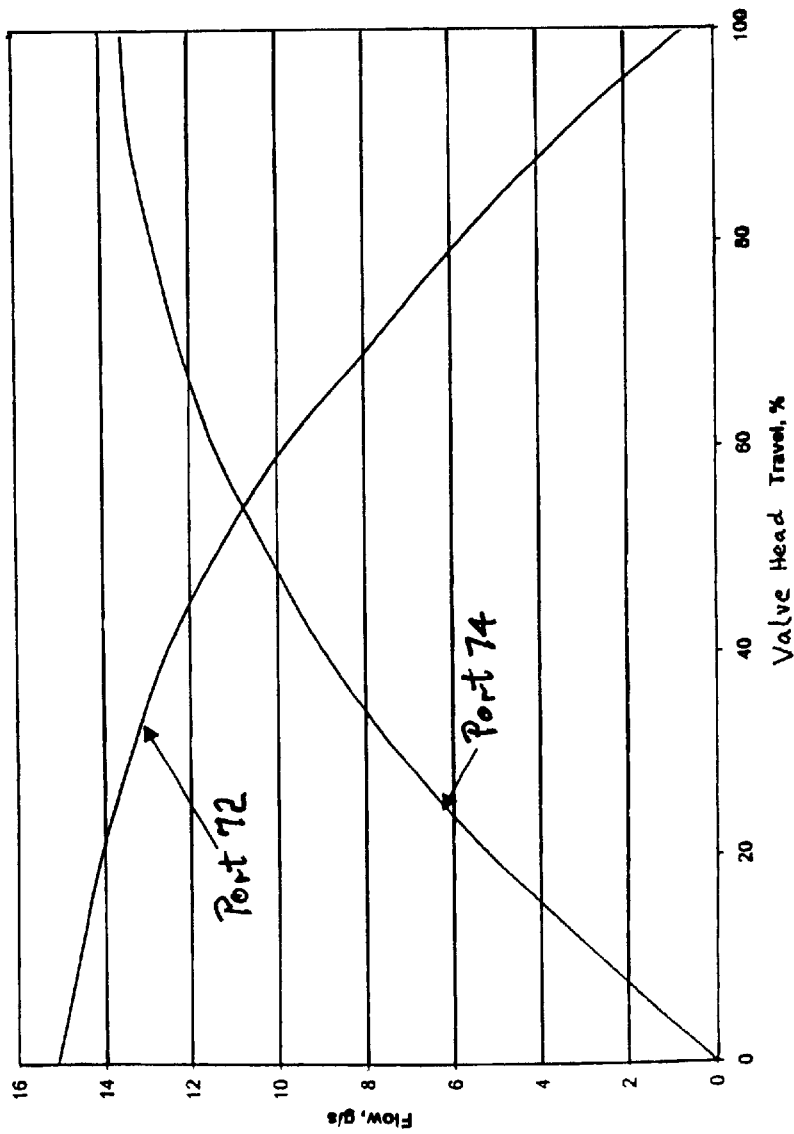
FIG. 4 is a graph showing amount of gas flow through the first and second ports independently as a function of percent travel of the valve head between the complete closure of each of the ports.

A coil spring 96 is disposed in compression between capnut 92 and upper bearing 46 for-urging valve head 76 toward second seat 70. In operation, actuator 14 operates against spring 96 to urge head 76 toward first seat 68. Thus, in response to armature position sensor 17, head 76 may be placed at any desired axial location between seats 68 and 70 to divide and simultaneously regulate the volume of first and second flows of gas through regulated ports 72 and 74. Typical flow curves through regulated ports 72 and 74 are shown in FIG. 4 as a function of valve head travel, 0% being regulated port 72 fully open and regulated port 74 fully closed.

Figure 2:
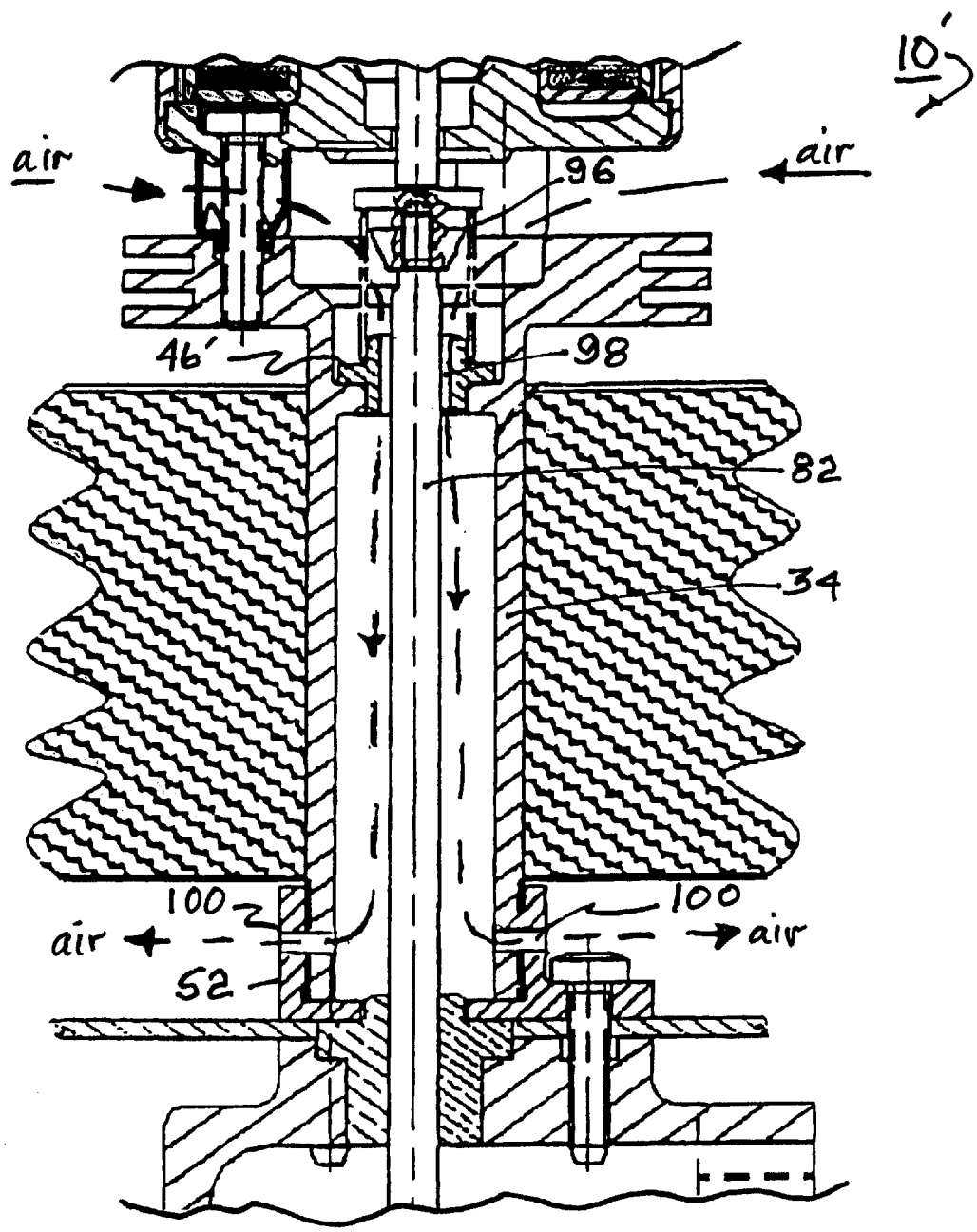
FIG. 2 is a view like that shown in FIG. 1, showing a portion of a second embodiment having a coupling tube subassembly wherein vents are provided in the outer bearing and coupling tube for forced-air cooling of the coupling tube assembly and to provide an engineered leak path which prevents higher pressure in the tube from leaking through the lower bushing and into the upper chamber, by bleeding off this higher pressure above the bushing.

As noted above, an important consideration in providing useful valves for some fuel cell applications is how to establish and maintain a suitable thermal environment for the actuating assembly which must be many hundreds of degrees cooler than the environment for the metering assembly within the fuel cell. Referring to FIG. 2, in a second embodiment 10' of a three-way metering valve assembly, a ventilation system is provided for cooling the coupling tube subassembly. Upper bearing 46' is provided with a plurality of longitudinal passageways 98, preferably as channels in the bore supporting pintle shaft 82, communicating with the outside of valve 10' through spring 96 and with the interior of upper flanged tube 34. A plurality of vent ports 100 through tube 34 and lower receptacle 52 allow air to be forced through tube 34 as shown in FIG. 2, thus cooling the coupling tube assembly and preventing high pressure gas from leaking from tube 34 through lower bearing 90 into second chamber 66.

Figure 3:
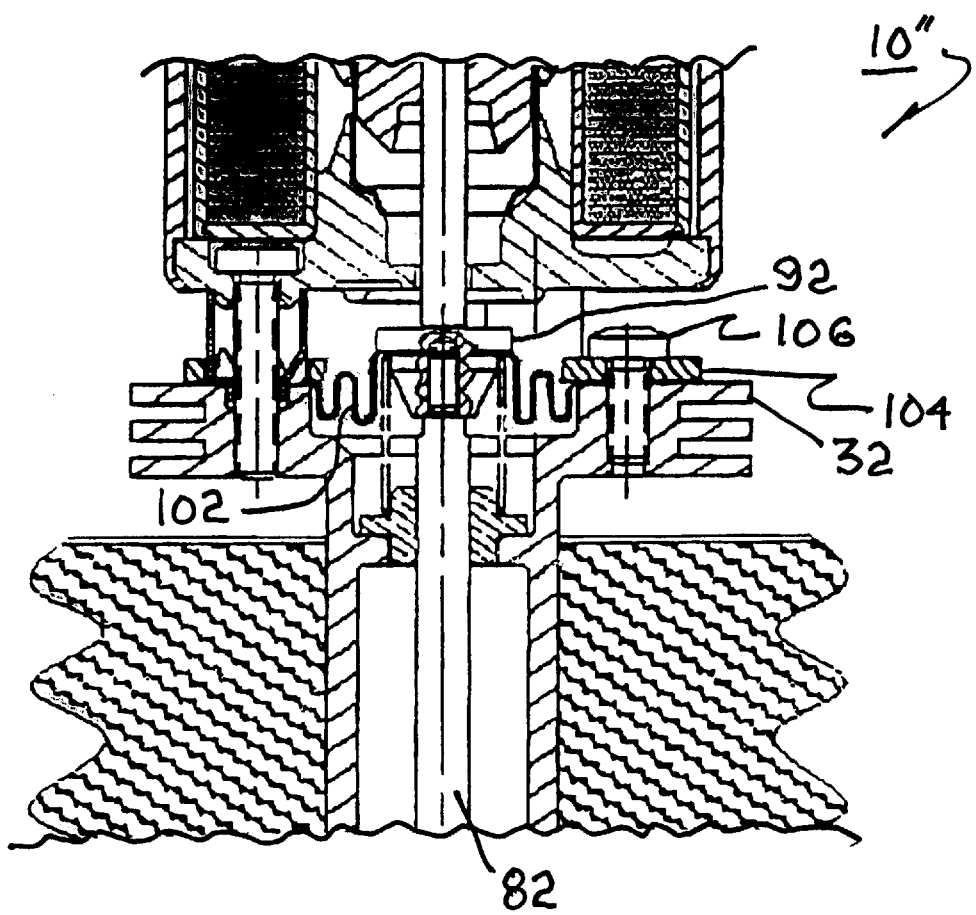
FIG. 3 is a view like that shown in FIG. 1, showing a portion of a third embodiment having a coupling tube subassembly wherein a convoluted diaphragm seal is incorporated at the outer end of the coupling tube and pintle shaft to form a positive, flexible barrier against leakage of gas out of the metering subassembly through the coupling tube subassembly.

In some fuel cell applications, active cooling as shown in FIG. 2 is not practical because of a requirement for zero leakage of gas from the coupling tube assembly, in which case the coupling tube assembly may be made substantially longer to provide a longer thermal path between the metering subassembly and the actuating subassembly. Referring to FIG. 3, in a third embodiment 10" of a three-way metering valve assembly, a positive seal is provided in the form of a convoluted diaphragm 102, preferably formed of a flexible metal. The convolutions in the diaphragm are selected such that minimal parasitic axial friction loads are imposed on the spring and actuator. Diaphragm 102 is retained at its inner periphery between capscrew 92 and pintle shaft 82, and at its outer periphery between a retaining plate 104 and flange 32 to which plate 104 is bolted by bolts 106.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary; rather than limiting, and the true scope of the invention is that described in the following claims.

What is claimed is:

1. A three-way valve assembly for selectively dividing and regulating the flow of a fluid entering the assembly through a non-regulating port and exiting the assembly through first and second regulated ports, comprising:
   a) a metering subassembly having a valve body including a first chamber including said non-regulating port and first and second regulated ports, said first and second regulated ports being provided with first and second valve seats, said valve body having a second chamber in communication with said first chamber via said second regulated port, said subassembly further having a valve head disposed within said first chamber for selectively mating with said first and second valve seats to regulate flows through said first and second regulated ports, said head having a pintle shaft connected thereto and extending through a wall of said valve body for displacing said head between said first and second valve seats;
   b) a coupling tube subassembly mounted on said metering subassembly and surrounding said pintle shaft; and
   c) an actuating subassembly mounted on said coupling tube subassembly and operative of said pintle shaft for controllably displacing said head to vary the amount of fluid flowing through said first and second regulated ports.

2. A three-way valve assembly for selectively dividing and regulating the flow of a fluid entering the assembly through a non-regulating port and exiting the assembly through first and second regulated ports, comprising:
   a) a metering subassembly having a valve body including a first chamber including said non-regulating port and first and second regulated ports, said first and second regulated ports being provided with first and second valve seats, said valve body having a second chamber in communication with said first chamber via said second regulated port, said subassembly further having a valve head disposed within said first chamber for selectively mating with said first and second valve seats to regulate flows through said first and second regulated ports, said head having a pintle shaft connected thereto and extending through a wall of said valve body for displacing said head between said first and second valve seats, said metering subassembly being formed of materials suitable for sustained operation at temperatures in excess of 800° C.;
   b) a coupling tube subassembly mounted on said metering subassembly and surrounding said pintle shaft; and
   c) an actuating subassembly mounted on said coupling tube subassembly and operative of said pintle shaft for controllably displacing said head to vary the amount of fluid flowing through said first and second regulated ports.

3. A three-way valve assembly in accordance with claim 2 wherein said valve body is formed of an inconel alloy.

4. A three-way valve assembly in accordance with claim 2 wherein said actuating subassembly is capable of sustained operation at temperatures up to 150° C.

5. A three-way valve assembly in accordance with claim 1 wherein said fluid comprises gaseous reformed hydrocarbon.

6. A three-way valve assembly in accordance with claim 5 wherein said gaseous reformed hydrocarbon includes hydrogen.

7. A three-way valve assembly in accordance with claim 1 further comprising spring means for biasing said head toward one of said first and second valve seats.

8. A three-way valve assembly in accordance with claim 1 further comprising seal means for preventing leakage of fluid from said metering is subassembly through said coupling tube subassembly.

9. A three-way valve assembly in accordance with claim 8 wherein said seal means includes a convoluted diaphragm disposed between said pintle shaft and said coupling tube subassembly.

10. A three-way valve assembly for selectively dividing and regulating the flow of a fluid entering the assembly through a non-regulating port and exiting the assembly through first and second regulated ports, comprising:
    a) a metering subassembly having a valve body including a first chamber including said non-regulating port and first and second regulated ports, said first and second regulated ports being provided with first and second valve seats, said valve body having a second chamber in communication with said first chamber via said second regulated port, said subassembly further having a valve head disposed within said first chamber for selectively mating with said first and second valve seats to regulate flows through said first and second regulated ports, said head having a pintle shaft connected thereto and extending through a wall of said valve body for displacing said head between said first and second valve seats;

b) a coupling tube subassembly mounted on said metering subassembly and surrounding said pintle shaft;

c) an actuating subassembly mounted on said coupling tube subassembly and operative of said pintle shaft for controllably displacing said head to vary the amount of fluid flowing through said first and second regulated ports; and d) means for cooling said coupling tube subassembly.

11. A three-way valve assembly in accordance with claim 10 wherein said means for cooling includes a grooved shaft bearing disposed in said coupling tube subassembly at a first end thereof, and at least one port near a second end thereof, said grooves and port communicating between the exterior and interior of said tube subassembly to define a pathway for passage of cooling air into and out of said coupling tube assembly.

12. A fuel cell, comprising:

a) a housing having an aperture therethrough; and b) a three-way valve assembly disposed in said aperture for regulating flow of fluid reformate in said fuel cell, said assembly including
   i) a metering subassembly, including a valve body, head, and pintle shaft, disposed within said housing and extending through said aperture;
   ii) a coupling tube subassembly mounted-on said metering subassembly outside said housing and surrounding said pintle shaft; and
   iii) an actuating subassembly mounted on said coupling tube subassembly and operative of said pintle shaft for controllably displacing said head within said valve body to vary the volumes of first and second flows from said valve body.

13. A fuel cell, comprising:

a) a housing having an aperture therethrough;

b) a three-way valve assembly disposed in said aperture for regulating flow of fluid reformate in said fuel cell, said assembly including:
   i) a metering subassembly, including a valve body, head, and pintle shaft, disposed within said housing and extending through said aperture;
   ii) a coupling tube subassembly mounted on said metering subassembly outside said housing and surrounding said pintle shaft; and
   iii) an actuating subassembly mounted on said coupling tube subassembly and operative of said pintle shaft for controllably displacing said head within said valve body to vary the volumes of first and second flows from said valve body; and c) an insulative layer surrounding said housing, said coupling tube subassembly extending through said layer.

14. A fuel cell, comprising:

a) a housing having an aperture therethrough; and b) a three-way valve assembly disposed in said aperture for regulating flow of fluid reformate in said fuel cell, said assembly including
   i) a metering subassembly, including a valve body, head, and pintle shaft, disposed within said housing and extending through said aperture, said valve body has a first chamber including a non-regulating port and first and second regulated ports, said first and second regulated ports being provided with first and second valve seats, said valve body having a second chamber in communication with said first chamber via said second regulated port, said metering subassembly further having said valve head disposed within said first chamber for selectively mating with said first and second valve seats to regulate flows through said first and second regulated ports, said pintle shaft being connected to said head and extending through a wall of said valve body for displacing said head between said first and second valve seats;
   ii) a coupling tube subassembly mounted on said metering subassembly outside said housing and surrounding said pintle shaft; and
   iii) an actuating subassembly mounted on said coupling tube subassembly and operative of said pintle shaft for controllably displacing said head within said valve body to vary the volumes of first and second flows from said valve body.

* * * * *